INVENTOR.
DONALD J. BAKER
BY Ralph B. Stewart
ATTORNEY.

INVENTOR.
DONALD J. BAKER
BY Ralph B. Stewart
ATTORNEY.

April 3, 1951 D. J. BAKER 2,547,360

ELECTROMAGNETIC RECORDING AND REPRODUCING SOUND HEAD

Filed July 30, 1946 3 Sheets-Sheet 3

INVENTOR.
DONALD J. BAKER
BY Ralph B. Stewart
ATTORNEY.

Patented Apr. 3, 1951 2,547,360

UNITED STATES PATENT OFFICE 2,547,360

ELECTROMAGNETIC RECORDING AND REPRODUCING SOUND HEAD

Donald J. Baker, Los Angeles, Calif.

Application July 30, 1946, Serial No. 687,055

11 Claims. (Cl. 179—100.41)

This invention relates to electromagnetic sound heads useful in recording and reproducing sound.

A broad object of the invention is to produce a sound head which may be used interchangeably for sound recording or for sound reproduction.

A further object is to devise a novel support for a stylus chuck and armature for use on lateral cut records and which does not involve the usual pivot bearings.

A further object is to devise an improved structure of a magnetic armature which also serves as a stylus chuck. Another feature of my improved sound head is that it does not respond to vertical vibration or movement of the armature.

Still another object of the invention is to provide for damping or suppressing resonance effects in the stylus mounting.

Other objects of the invention will appear from the description of the invention below.

My invention will be explained in connection with the accompanying drawings in which Figure 1 is a longitudinal sectional view in which the casing and the permanent magnet are shown in section, the other elements being shown in elevation;

Figures 1, 2, 3, 4, 5, 6, 7:
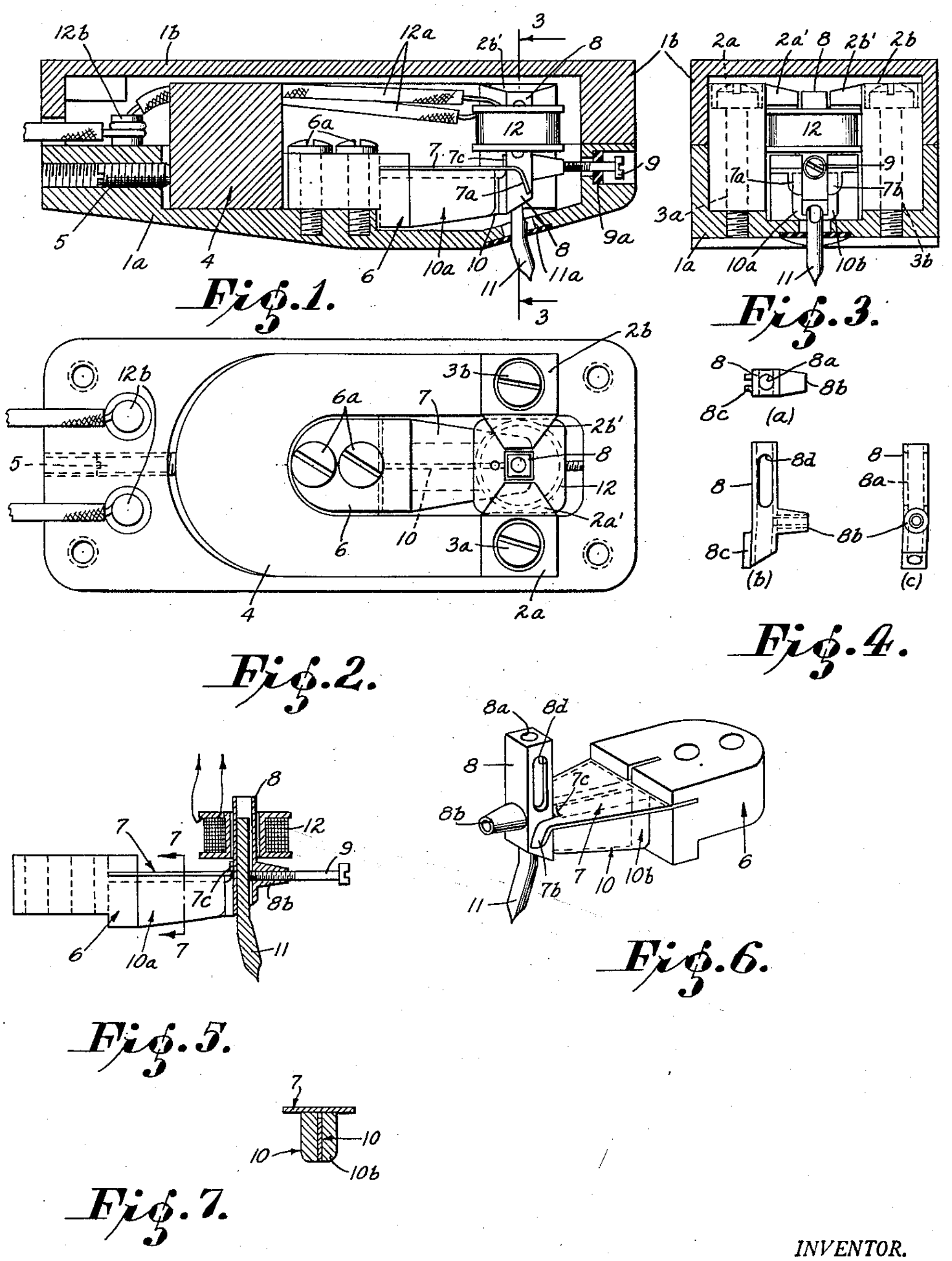
Figure 2 is a plan view of Figure 1 with the top half of the casing removed.
Figure 3 is a sectional view of Figure 1 taken along the line 3—3, the casing alone being shown in section.
Figure 8:
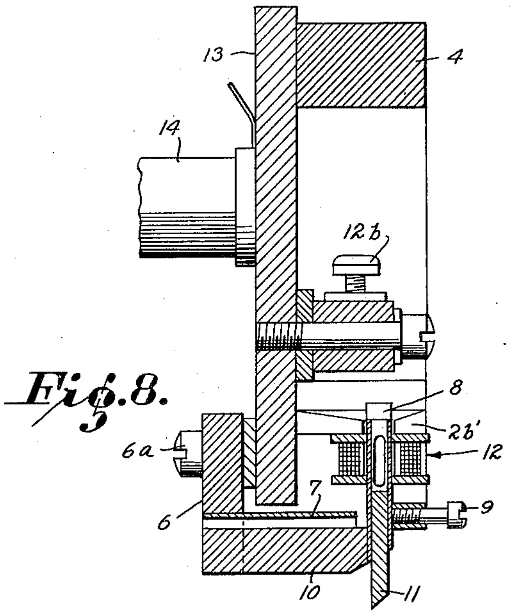
Figure 10:
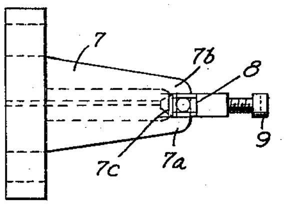
Figure 11:
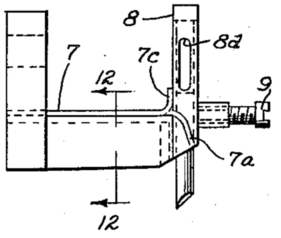
Figure 12:
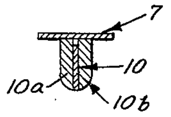
Figure 9:
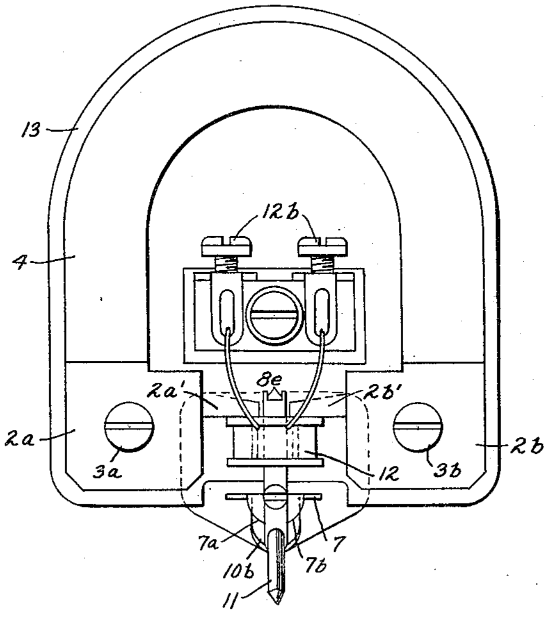
Figure 13:
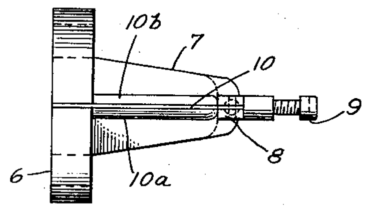
Figure 14:
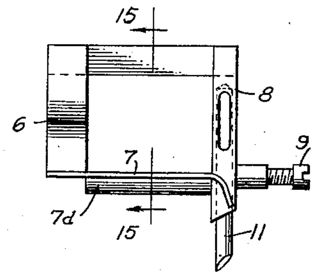
Figure 16:
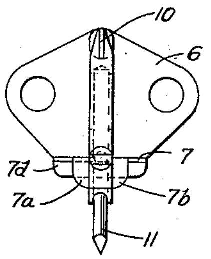
Figure 15:
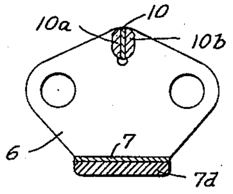

Figure 4 involves three views of the improved magnetic armature and stylus chuck, view (*a*) being a plan view, (*b*) a side elevational view and (*c*) a front elevational view;

Figure 5 is a side view of the mounting for the armature and stylus chuck and showing the pick-up coil surrounding the armature, the coil, chuck and stylus being shown in section;

Figure 6 is a perspective view showing the arrangement for mounting the magnetic armature for vibration about a horizontal axis without the use of pivot bearings;

Figure 7 is a sectional view of Figure 5 taken along the line 7—7;

Figure 8 is a sectional view of a modified form of sound head taken through a central vertical plane;

Figure 9 is a front view of the construction shown in Figure 8;

Figure 10 is a plan view of the stylus chuck mounting employed in Figure 8;

Figure 11 is a side elevational view of Figure 10;

Figure 12 is a sectional view of Figure 11 taken on the line 12—12;

Figure 13 is a plan view of a modified form of stylus chuck mounting;

Figure 14 is an elevational view of Figure 13;

Figure 15 is a sectional view of Figure 14 taken along the line 15—15;

Figure 16 is a front view of Figure 14; and

Figure 17:
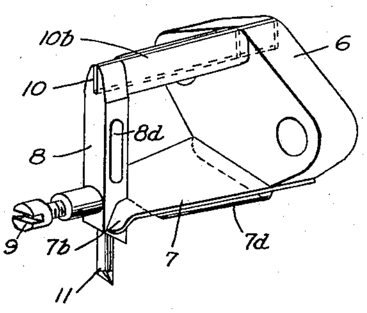

Figure 17 is a perspective view of the chuck mounting shown in Figures 13 to 16.

Referring to Figures 1 to 7 of the drawing, the preferred form of my improved sound head includes a casing formed of a bottom half 1*a* and a top half 1*b*, the two halves being secured together by suitable screws at the four corners of the casing. This casing may be die-cast from metal or molded from plastic material. Both halves of the casing are provided with suitable cavities for receiving the various elements of the sound head. A pair of magnetic pole pieces 2*a* and 2*b* are mounted in the cavity of the lower half 1*a* near the front thereof and on opposite sides of the casing. These pole pieces are secured to the bottom wall of the casing by suitable screws 3*a* and 3*b*. A pair of inwardly extending pole extensions 2*a'* and 2*b'* are provided on pole pieces 2*a* and 2*b*, respectively, at their upper ends, see Figure 3. A U-shaped permanent magnet 4 is supported within the cavity of the lower casing 1*a*, the arms of the magnet being in contact with the pole pieces 2*a* and 2*b*, as shown in Figure 2, and the magnet is clamped in this position by means of a screw 5 threaded into a hole formed in the rear end of the lower casing 1*a*.

A metallic block 6 is positioned between the arms of magnet 4 adjacent the bend of the magnet and is secured to the bottom wall of the casing 1*a* by suitable screws 6*a*. This block forms a supporting base for a horizontal blade-like element 7, the rear end of which is secured in a kerf or groove formed in the front face of the block 6. This blade is of tapered shape as shown in Figure 2 and the front end of the blade is split by two parallel cuts to form two outer tongues 7*a* and 7*b* and a central tongue 7*c*. The outer tongues 7*a* and 7*b* are bent downwardly as shown in Figure 1 and are positioned on opposite sides of an armature 8 the lower end of which forms a stylus chuck, while the central tongue 7*c* is bent upwardly and bears against the rear face of the chuck 8. As shown more clearly in Figure 4 the body portion of the stylus chuck is of square shape and has a round bore 8*a* extending throughout its length. The chuck is secured to the forward end of blade 7 by soldered or welded connections between the body of the chuck and the tongues 7a, 7b and 7c. The chuck is mounted in a vertical position as shown in the drawing. An integral stud 8b extends forward from the front face of the chuck 8 and is provided with a threaded bore for receiving a stylus clamping screw 9. The stud 8b is preferably positioned so that its axis lies substantially in the plane of the plate 7.

The block 6 is also provided with a vertical kerf or groove formed in its front face at the middle thereof, and the rear end of a vertically arranged blade 10 is secured within this kerf, the front end of the blade extending into the groove of a slotted rib 8c formed on the back of the chuck 8 at its lower end. The front end of blade 10 is secured to the chuck by a soldered or welded joint.

The blades 7 and 10 are preferably formed of thin resilient material such as Phosphor-bronze or steel. The stylus chuck 8 is entirely supported from the block 6 by means of the cantilever blades 7 and 10. The vertically arranged blade 10 prevents upward deflection of the stylus chuck, and the horizontally arranged blade 7 prevents movement of the chuck as a whole about a vertical axis. The arrangement of the two blades 7 and 10 at right angles to each other results in an arrangement for supporting the stylus chuck and armature on a fixed horizontal axis but permits rotation of the chuck and armature about this axis by flexing of the blades along their lengths. The horizontal axis about which the chuck and armature oscillate lies substantially in the plane of the blade 7 and passes substantially through the center of the stud 8b and screw 9. Thus, the stylus mounting is adapted for operation with lateral cut records but is unsuited for vertical cut records.

As shown in Figure 4b, the square body portion of the stylus chuck extends upwardly from the stud 8b and forms a magnetic armature the upper end of which is positioned in the space between the opposing faces of pole extensions 2a' and 2b'. For the purpose of reducing the mass of this armature, the stylus chuck is bored throughout its length with a round bore 8a, and each side wall of the armature portion of the chuck is slotted as shown at 8d in Figure 4b, and in Figure 6. The central bore 8a and the slots 8d materially reduce the mass of the vibrating armature and stylus chuck without materially interfering with the magnetic action of the armature portion of the chuck.

For the purpose of damping resonance effects in the stylus mounting structure, two strips of plastic material 10a and 10b are cemented to opposite faces of the vertically arranged blade 10, and the upper edges of these strips are also cemented or otherwise secured to the underface of horizontal blade 7. These two strips of material may be formed of known damping material of the synthetic resin type. The upper edge of the blade 10 is not joined to the lower face of blade 7, and as shown in Figure 7 the blade 10 does not extend all the way up to the blade 7.

The stylus or needle 11 supported in the chuck 8 extends downwardly through an opening in the bottom wall of casing 1a, and this opening is sealed by a gasket 11a of rubber or other suitable material. A similar gasket 9a is provided around the clamping screw 9 for sealing the opening through which this screw passes. Gaskets 9a and 11a prevent magnetic particles from entering the casing and lodging within the magnetic gaps between the armature and the pole pieces.

A coil 12, which acts as a pickup coil when the unit is used for reproducing purposes and as a driving coil when the unit is used for recording purposes, surrounds the armature portion of the stylus chuck 8 and is supported immediately below the pole extensions 2a' and 2b' as clearly shown in Figures 1 and 3. The coil 12 is connected by suitable leads 12a to connecting terminals 12b mounted on the casing 1a at the rear end thereof. The center hole of the coil 12 provides sufficient clearance around the armature 8 to permit it to vibrate between the pole extensions 2a' and 2b' without interference from the coil structure.

As shown in Figure 3, the chuck and armature piece 8 is mounted in a vertical position within the space between pole pieces 2a and 2b, and the upper end of the armature passes through the coil 12 and extends into the space between the pole extensions 2a' and 2b'. Vibration of the armature from side to side causes a change in the magnetic flux linking the coil 12 and thereby induces a voltage in the coil. Also, when coil 12 is energized by alternating current, the resulting interaction between the magnetized armature 8 and the pole extensions causes the armature to vibrate about its mounting axis.

The stylus 11 shown in Figures 1 to 6 is of the embossing type suitable either for recording or for reproducing purposes. No change in physical structure is required to convert from recording to reproducing and vice versa, except an adjustment of the weight or pressure on the stylus. For recording, the pressure should be of the order of five ounces, and for reproducing the pressure is reduced to a pressure of the order of one ounce.

A second form of my sound head is illustrated in Figures 8 to 12, inclusive. In this arrangement the magnet 4 is mounted in a vertical plane instead of in a horizontal plane, and a "cutting" type of stylus is shown instead of an embossing stylus. In the following description of the arrangement shown in Figures 8 to 12, elements which have the same function as corresponding elements in Figures 1 to 7 will be designated by the same reference numerals.

Referring to Figures 8 and 9, a vertical plate 13 is supported at the end of a suitable supporting arm 14 and carries on its front face two spaced pole pieces 2a and 2b. A U-shaped magnet 4 is also mounted on the front face of plate 13 and the arms of this magnet are in contact with the upper faces of pole pieces 2a and 2b. These pole pieces are also provided with pole extensions 2a' and 2b' extending inwardly from a point near the upper ends of the pole pieces, in substantially the same manner as in Figure 3.

The mounting for the stylus chuck and armature is generally the same as that shown in Figures 1 to 7, except that the mounting block 6 is shaped differently and is secured to the back of plate 13 by screws 6a in the manner shown in Figure 8. The mounting blades 7 and 10 extend beneath the lower end of the plate 13 so that the chuck and armature 8 is positioned in front of the plate 13 and is centrally located with respect to the pole pieces 2a and 2b. As shown in Figures 10, 11 and 12, the manner of mounting the chuck 8 on the block 6 is substantially the same as that in Figures 1 to 7. The construction of the armature portion of the chuck 8 is also substantially the same as in Figures 1 to 7, except that the armature is extended somewhat above the pole extensions 2a' and 2b', and the upper end of the armature is slotted in a direction parallel with its axis of vibration as shown at 8e in Figure 9. The extended portions of the armature serve to collect the fringe flux from the pole extensions, and the slot 8e reduces the mass of the extension.

The coil 12 is also mounted in the space between pole pieces 2a and 2b directly under the pole extensions 2a' and 2b', and the leads 12a of this coil are connected to suitable terminals 12b mounted on the front face of the plate 13.

It will be understood that there is no essential difference between the operation of the modification shown in Figures 8 to 12 from that shown in Figures 1 to 7. A "cutter" type of stylus is shown in Figures 8 to 12 while an embossing type is shown in Figures 1 to 7. With this type of stylus the mounting for the stylus will be different from an embossing stylus in that the supporting blades 7 and 10 will be somewhat thicker and shorter, but the construction remains essentially the same.

In Figures 13 to 17 I have shown a modified construction for mounting the stylus chuck and armature, and while the base block 6 shown in this arrangement is adapted for use in the modification shown in Figures 8 and 9, it will be readily apparent that this construction may be applied to Figures 1 to 7. In this arrangement the horizontal blade 7 is secured to the lower edge of the block 6 and supports the chuck in substantially the same manner as described above. The vertical blade 10, however, instead of being arranged beneath the horizontal blade 7, is spaced above blade 7 and is secured to the upper end of the armature portion of the chuck 8. This blade would be positioned above the pole extensions 2a' and 2b', and the front end of the blade would be soldered in a saw-cut formed in an extension of the armature above the pole extensions. The rear end of blade 10 is soldered in a saw-cut formed in the upper part of block 6. As shown in Figure 15, a strip of damping material 7d is cemented to the lower face of blade 7, although it could be cemented to the upper face. Also, strips of damping material 10a and 10b may be cemented to opposite faces of the vertical blade 10.

In the mounting arrangement shown in Figures 13 to 17, the vertical blade 10 prevents up and down movement of the stylus in the same manner as in Figures 1 to 7, and the horizontal blade 7 prevents lateral movement of the stylus chuck as a whole. The two blades serve to support the chuck and armature on a fixed horizontal axis passing substantially through the plane of blade 7 and through the axis of clamping screw 9, and the chuck and armature may be vibrated about this axis by twisting of the blades 7 and 10.

From the foregoing it will be seen that in the various forms of my invention, the upper end of the vertical magnetic armature is positioned within a gap formed between a pair of magnetic members (pole extensions 2a' and 2b'), the coil of the unit is positioned below these two magnetic members and surrounds the magnetic armature, and the horizontal supporting blade which determines the vibratory axis of the armature is positioned below the coil and has its horizontal axis arranged at right angles to the axis of the pole pieces. The vertically arranged blade which prevents vertical movement of the armature may be arranged either below the horizontal blade or above it.

While I have described the preferred form of my invention and certain modifications thereof, it will be understood that other changes may be made without departing from the invention.

I claim:

1. In a sound head, the combination of a pair of vertical pole pieces arranged in horizontally spaced relation, a pair of pole extensions provided on said pole pieces near the upper ends thereof and extending inwardly therefrom, a magnetic armature arranged vertically between said pole pieces and having the upper end thereof extending between said pole extensions, an electric coil surrounding said armature and positioned between said pole pieces below said pole extensions, a support for said armature comprising a thin, relatively wide blade of resilient material arranged with its broad face in a horizontal plane and being secured at one end to said armature below said coil and having the other end thereof secured to a fixed base, and a second supporting blade for said armature arranged with its broad face in a vertical plane and having one end thereof secured to said armature and the other end secured to said fixed base, whereby the upper end of said armature may vibrate between said pole extensions about a horizontal axis positioned below said coil.

2. In a sound head, the combination of a pair of magnetic members arranged in spaced relation to form a gap therebetween, an elongated armature arranged vertically with the upper end thereof positioned within said gap, an electric coil surrounding said armature and positioned below said magnetic members, a thin relatively wide blade-like member of resilient material arranged with its broad face in a horizontal plane below said coil and being secured at one end to said armature, the axis of said blade extending at right angles to the axis of said magnetic members, and the outer end of said blade being secured to a fixed base, said blade-like member forming a support for said armature for pivotal movement thereof substantially about the axis of said blade, whereby the upper end of said armature may vibrate between said spaced magnetic members, and a second blade-like member of resilient material secured at one end to said base in a vertical plane and being secured at the other end to said armature to prevent vertical movement thereof.

3. In a sound head, the combination of a pair of magnetic members arranged in spaced relation to form a gap therebetween, an elongated armature arranged vertically with the upper end thereof positioned within said gap, an electric coil surrounding said armature and positioned below said magnetic members, a thin relatively wide blade-like member of resilient material arranged with its broad face in a horizontal plane below said coil and being secured at one end to said armature, the axis of said blade extending at right angles to the axis of said magnetic members, and the outer end of said blade being secured to a fixed base, said blade-like member forming a support for said armature for pivotal movement thereof substantially about the axis of said blade, whereby the upper end of said armature may vibrate between said spaced magnetic members, and a second blade-like element of resilient material arranged in a vertical plane below said horizontal blade, said second blade being secured at one end to said fixed base and at the other end to said armature to prevent vertical movement thereof.

4. In a sound head, the combination of a pair of magnetic members arranged in spaced relation to form a gap therebetween, an elongated armature arranged vertically with the upper end thereof positioned within said gap, an electric coil surrounding said armature and positioned below said magnetic members, a thin relatively wide blade-like member of resilient material arranged with its broad face in a horizontal plane below said coil and being secured at one end to said armature, the axis of said blade extending at right angles to the axis of said magnetic members, and the outer end of said blade being secured to a fixed base, said blade-like member forming a support for said armature for pivotal movement thereof substantially about the axis of said blade, whereby the upper end of said armature may vibrate between said spaced magnetic members, and a second blade-like element of resilient material arranged in a vertical plane and having one end thereof secured to said fixed base and the other end thereof secured to said armature above said coil.

5. In a sound head, the combination of a vertically arranged magnetic armature of substantially square external shape, a horizontally arranged blade-like member of resilient material having one end thereof split to form two outer tongues and a central tongue, said two outer tongues being bent downwardly and embracing opposite sides of the lower end of said armature and said center tongue being bent upwardly and engaging the rear side of said armature, said tongues being secured to said armature to support the same from said horizontal blade, and a fixed base element for supporting the other end of said horizontal blade.

6. A sound head construction according to claim 5 and including a second blade of resilient material arranged in a vertical plane below said horizontal blade and having one end thereof secured to said fixed base and the other end thereof secured to said armature to prevent vertical movement thereof.

7. A sound head construction according to claim 5 and including a second blade element of resilient material arranged in a vertical plane above said horizontal blade with one end thereof secured to said fixed base and the other end thereof secured to the upper end of said armature.

8. A sound head construction according to claim 5 and including a second blade of resilient material arranged in a vertical plane below said horizontal blade and having one end thereof secured to said fixed base and the other end thereof secured to said armature to prevent vertical movement thereof, and two strips of plastic damping material cemented to opposite sides of said second blade and to the underside of said horizontal blade.

9. A sound head construction according to claim 5 wherein said armature is provided with a central bore throughout its length, and including means at the lower end thereof for clamping a stylus in said bore.

10. In a sound head, the combination of a pair of magnetic pole pieces arranged in spaced relation to form a gap therebetween, a vertically arranged magnetic armature of substantially square external shape having the upper end thereof positioned within said gap, an electric coil surrounding said armature and positioned below said pole pieces, a thin relatively wide blade-like member of resilient material arranged with its broad face in a horizontal plane below said coil and being secured to said armature, the axis of said blade extending at right angles to the axis of said pole pieces, and the outer end of said blade being secured to a fixed base, whereby said blade supports said armature for pivotal movement thereof substantially about the axis of said blade and the upper end of said armature may vibrate between said pole pieces, said magnetic armature being provided with a central bore in the upper end thereof, and elongated slots being formed in the walls of said armature facing said pole pieces and extending through said coil.

11. In a sound head, the combination of a vertically arranged magnetic armature of substantially square external shape, a blade-like member of resilient material having one end thereof secured to said armature near the lower end of said armature and having its broad face arranged in a horizontal plane, a fixed base element for supporting the other end of said horizontal blade whereby said armature is supported by said horizontal blade for pivotal movement substantially about the axis of said blade, the portion of said armature extending above said blade having a central bore therein, and opposite walls of the upper portion of said armature having elongated slots formed therein, the common axis of said slots being at right angles to the axis of said blade.

DONALD J. BAKER.

REFERENCES CITED

The following references are of record in the file of this patent:

UNITED STATES PATENTS

| Number | Name | Date |
|---|---|---|
| 1,835,072 | McClatchie | Dec. 8, 1931 |
| 1,967,335 | Steigman | July 24, 1934 |
| 2,155,469 | Burt | Apr. 25, 1939 |
| 2,347,347 | Yenzer | Apr. 25, 1944 |
| 2,373,181 | Fleming | Apr. 10, 1945 |
| 2,400,305 | Hazeltine | May 14, 1946 |
| 2,441,651 | Thompson | May 18, 1948 |
| 2,466,469 | Nicholls | Apr. 5, 1949 |